United States Patent

Nakao et al.

[15] 3,658,648
[45] Apr. 25, 1972

[54] METHOD FOR THE PRODUCTION OF COENZYME Q

[72] Inventors: Yoshio Nakao, Ibaraki; Mitsuzo Kuno, Suita; Saburo Yamatodani, Minoo; Isuke Imada, Ibaraki; Hiroshi Morimoto, Kobe, all of Japan

[73] Assignee: Takeda Chemical Industries, Ltd., Osaka, Japan

[22] Filed: Sept. 18, 1967

[21] Appl. No.: 668,694

[30] Foreign Application Priority Data

Sept. 17, 1966 Japan.....................................41/61555

[52] U.S. Cl. ..........................................................195/28 R
[51] Int. Cl. ................................................................C12b 1/00
[58] Field of Search ................195/28, 3 H, 3 R, 29; 260/396

[56] References Cited

UNITED STATES PATENTS

| | | | |
|---|---|---|---|
| 3,219,543 | 11/1965 | Douros et al. | 195/28 |
| 3,222,258 | 12/1965 | Iizuka et al. | 195/3 H |
| 3,308,035 | 3/1967 | Douros | 195/28 |
| 3,355,296 | 11/1967 | Perkins et al. | 195/3 H |

OTHER PUBLICATIONS

Arch. of Biochem. and Biophy. Vol. 89, pp. 318– 321 (1960) Coenzyme Q, page, A.C. et al.

Primary Examiner—A. Louis Monacell
Assistant Examiner—Gary M. Nath
Attorney—Wenderoth, Lind & Ponack

[57] ABSTRACT

Coenzyme Q of the formula

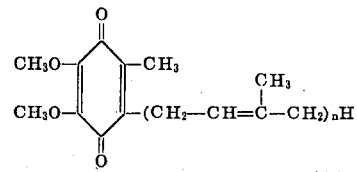

wherein $n$ is an integer from 5 to 10 inclusive, is produced in good yield by incubating hydrocarbon-assimilating microorganism in a culture medium comprising a carbon source consisting mainly of hydrocarbons containing not less than 10 percent (volume/volume) of normal paraffins of nine to 23 carbon atoms, inclusive, and recovering the coenzyme Q accumulated in the culture broth.

8 Claims, No Drawings

METHOD FOR THE PRODUCTION OF COENZYME Q

This invention relates to a method for the production of coenzyme Q. More particularly, this invention relates to a method for producing coenzyme Q of the formula

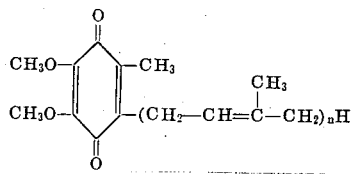

wherein $n$ is an integer from 5 to 10 inclusive, which comprises inoculating a hydrocarbon-assimilating microorganism onto a culture medium comprising a carbon source consisting mainly of hydrocarbons containing not less than 10 percent (volume/volume; throughout the specification and the working examples, percentages are volume/volume) of normal paraffins, the number of carbon atoms of which is within the range from 9 to 23 inclusive, incubating the culture medium until the objective coenzyme Q is substantially accumulated in the microorganism cells, and recovering therefrom so-accumulated coenzyme Q.

It is known that coenzyme Q of the formula (I), i.e., coenzyme $Q_5$, coenzyme $Q_6$, coenzyme $Q_7$, coenzyme $Q_8$, coenzyme $Q_9$ and coenzyme $Q_{10}$ are contained in the cells of various kinds of microorganisms (throughout the specification and the working examples the integer after the coenzyme Q designates the number of its isoprene unit of the side chain) and that coenzyme Q is useful, e.g., for the treatment of diabetes mellitus, for the treatment of peptic ulcer and for preserving spermatozoa for artificial insemination of livestock. For example, it is reported that coenzyme $Q_5$ is obtained from *Escherichia coli*, coenzyme $Q_6$ from *Saccharomyces cerevisiae, Saccharomyces ludwigii* and *Zygosaccharomyces barkeri*, coenzyme $Q_7$ from *Proteus vulgaris* and *Saccharomyces cerevisiae*, coenzyme $Q_8$ from *Azotobacter vinelandii, Escherichia coli* and *Serratia marcescens*, coenzyme $Q_9$ from *Proteus vulgaris, Pseudomonas aeruginosa, Pseudomonas putida* and *Penicillium chrysogenum*, and coenzyme $Q_{10}$ from *Pseudomonas denitrificans* and *Neurospora crassa*. However, their content in such microorganism cells is very small. Therefore, the hitherto-employed method for producing coenzyme Q by incubating such microorganism(s) in a culture medium and subjecting the resultant microorganism cells to extraction is not industrially profitable.

It has long been an art desideratum to establish an industrially profitable method for producing coenzyme Q.

The present invention, fulfilling the said desideratum, and thus providing a useful and industrially feasible process for producing coenzyme Q, is based on the following new findings.

Among the microorganisms belonging to various genera, there are included microorganisms which are capable of assimilating hydrocarbons, especially normal paraffins having a carbon atom number within the range from nine to 23 inclusive, which are readily available at a relatively low cost as carbon sources from among various kinds of hydrocarbons. Further, when these microorganisms are incubated in a culture medium wherein the carbon source consists mainly of hydrocarbons containing the said normal paraffins, a considerably large amount of coenzyme Q is accumulated in the microorganism cells, and not infrequently a remarkably large amount of such cells is obtained, as compared with the case of conducting incubation in a conventional medium containing as carbon sources carbohydrates such as glucose and molasses. Thus, coenzyme Q can be recovered from the culture broth in a good yield at a low cost.

It is thus the main object of this invention to provide a new and useful method for the industrial production of coenzyme Q.

Another object of the invention is to minimize troublesome procedures and disadvantages entailed in effecting the hitherto-known microbial process for the production of coenzyme Q.

The microorganisms employable for the purpose of the present invention can be selected from those which can assimilate hydrocarbons, in accordance with the kind of desired coenzyme Q. For example, for the purpose of producing coenzyme $Q_8$ and/or coenzyme $R_9$ there are employed microorganisms belonging to the genera *Pseudomonas, Candida* or *Achromobacter*. Such microorganisms are exemplified, e.g., by *Pseudomonas alkanolytica* nov. sp., *Pseudomonas aeruginosa, Candida tropicalis, Candida parapsilosis, Candida claussenii* and *Achromobacter paraffinoclastus* nov. sp.

Among these microorganisms, *Pseudomonas alkanolytica* nov. sp. and *Achromobacter paraffinoclastus* nov. sp. were isolated from soil in Osaka, Japan and confirmed as novel species.

The *pseudomonas alkanolytica Nov. sp.* has the following characteristics which are confirmed according to the description in the "Manual of Microbiological Methods, Society of American Bacteriologists (1957)":

I. Cell Characteristics:
   Small rods near to cocci, 0.9 by 1.1 microns. Non-motile and non-sporulating.
II. Staining characteristic:
   Gram-negative.
III. Cultural characteristics:
   1. Nutrient agar plate: Untransparent greyish white, circular, smooth, entire, convex surface.
   2. Nutrient agar slant: Growth abundant, greyish white spreading.
   3. Nutrient agar stab: Growth on surface, filiform.
   4. Nutrient broth: Turbidity with sediment, non-formation of velum.
IV. Physiological characteristics:
   1. pH relations: Growth at pH 5.0 to 9.0, optimum at about 7.0.
   2. Temperature relations: Growth at 15° to 37° C, optimum at 37° C.
   3. $O_2$ relations: aerobic.
   4. Gelatin: No liquefaction.
   5. Starch assimilation: Negative.
   6. Urea assimilation: Negative.
   7. Indole: Not produced.
   8. Ammonia: Not produced.
   9. Hydrogen sulfide: Not produced.
   10. Nitrates reduction: Nitrates produced from nitrates.
   11. Catalase: Positive
   12. Acetylmethylcarbinol: Not produced.
   13. Methyl red test: Negative.
   14. Litmus milk: Coagulated and acidic litmus not reduced.
   15. Acid but no gas from glucose, galactose, mannose, xylose. No acid and no gas from fructose, arabinose, sucrose, lactose, maltose, mannitol, sorbitol, glycerol.

Detailed comparison of the above-mentioned characteristics with the descriptions in "Bergey's Manual of Determinative Bacteriology," Seventh Edition, reveals that this microorganism belongs to the genus Pseudomonas. But this microorganism is quite different in microbial characteristics from any of the species belonging to Pseudomonas described in the above-mentioned reference. Therefore, this microorganism is a novel species of the genus Pseudomonas, and has been named *Pseudomonas alkanolytica*.

A specimen of *Pseudomonas alkanolytica* nov. sp. has been deposited at American Type Culture Collection, Rockville, Maryland, under the accession number ATCC 21034.

The *Achromobacter paraffinoclastus* nov. sp. has the following characteristics which are confirmed according to the description in the above-mentioned Manual of Microbiological Methods:

I. Cell characteristics:
   Small rods, 0.8 to 1.2 by 1.0 to 2.0 microns. Non-motile and non-sporulating.
II. Staining characteristic:
   Gram-negative.

III. Cultural characteristics:
1. Nutrient agar plate: Untransparent greyish white, circular, entire, convex surface.
2. Nutrient agar slant: Greyish white and filiform.
3. Nutrient agar stab: Growth on surface, filiform.
4. Nutrient broth: Slight turbidity with sediment, formation of thin velum.

IV. Physiological characteristics:
1. pH relations: Growth at pH 5.0 to 9.0, optimum at about 7.0.
2. Temperature relations: Growth at 15° to 37° C, optimum at 30° C.
3. $O_2$ relations: aerobic.
4. Gelatin: No liquefaction.
5. Starch assimilation: Negative.
6. Urea assimilation: Negative.
7. Indole: Not produced.
8. Ammonia: Produced.
9. Hydrogen sulfide: Produced.
10. Nitrates reduction: Nitrites not produced from nitrates.
11. Catalase: Positive.
12. Acetylmethylcarbinol: Not produced.
13. Methyl red test: Negative.
14. Litmus milk: Litmus slightly reduced.
15. No acid and no gas from glucose, fructose, galactose, mannose, xylose, arabinose, sucrose, lactose, maltose, mannitol, sorbitol, glycerol.

Detailed comparison of the above-mentioned characteristics with the description in "Bergey's Manual of Determinative Bacteriology," Seventh Edition, reveals that this microorganism belongs to the genus Achromobacter judged from such characteristics as Gram-negative, non-motile, no production of soluble pigment, no assimilation of glucose, no action to agar and no alkalization of litmus milk. But the present microorganism is quite different in characteristics from any of the species belonging to Achromobacter described in the said reference. Therefore, this microorganism is a novel species of the genus Achromobacter, and has been named *Achromobacter paraffinoclastus*.

A specimen of *Achromobacter paraffinoclastus nov. sp.* has been deposited at American Type Culture Collection, Rockville, Maryland, under the accession number ATCC 21130.

According to this invention, it is generally preferable to employ a liquid culture medium, and the incubation is carried out aerobically, i.e., with aeration and agitation either under static conditions or by a submerged process. The culture medium employed in this invention is required to contain, as a carbon source, hydrocarbons containing normal paraffins of a carbon atom number within the range of nine to 23 inclusive, especially 14 to 20 inclusive.

The amount of the said normal paraffins contained in the hydrocarbons should be not less than 10 percent of the whole amount of hydrocarbons employed, from the standpoint of the growth of the microorganism as well as the yield of the objective coenzyme Q.

The normal paraffins may consist of only one kind of normal paraffins of a carbon atom number within the said range of nine to 23 or of two or more kinds of normal paraffins, each having a carbon atom number within the aforesaid range of nine to 23. Hydrocarbons consisting only of the said normal paraffins are most advantageously employed in the present invention. But the hydrocarbon source in the present invention may, occasionally, contain other hydrocarbons (e.g., branched paraffins, olefins, cyclic paraffins, aromatic hydrocarbon, normal paraffins of one to eight or not less than 24 carbon atoms, etc.) than the normal paraffins of carbon atom number within the aforesaid range of nine to 23, as long as the normal paraffins of carbon atom number within the said range of nine to 23 are included as a whole in an amount of not less than 10 percent.

From the viewpoint of both the growth of the microorganism and yield of the objective coenzyme Q, the hydrocarbons are generally used in such an amount as to make the concentration of the normal paraffins of carbon atom number within the said range of nine to 23 in the culture medium, as a whole, about 3 to 15 percent, inclusive.

As these hydrocarbons are hardly soluble in water, the addition thereof to an aqueous culture medium is practically carried out under stirring or shaking to prepare a suspension containing then as very fine particles. If desired, a suspending agent, e.g., a surfactant of the type of polyoxethylene sorbitan monostearate (commercially available, e.g., as Tween-60) is employed.

In addition to the hydrocarbons, the culture medium advantageously also contains nitrogen source as a nutrient. As the nitrogen source, any of those used in the hitherto-known methods can be employed, and these are exemplified by inorganic nitrogen compounds such as ammonium salts, nitrates, etc. or nitrogen-containing materials such as peptone, soybean powder, cornsteep liquor, meat extract, yeast extract, etc. Furthermore, a small quantity of inorganic salts such as sodium chloride, potassium phosphate, salts of metals, e.g., of magnesium, zinc, iron, manganese, etc. may be added to the medium.

Incubation conditions such as the pH of the medium and the incubation temperature are controlled so as to have the objective coenzyme Q accumulated in maximum amount.

Generally, the pH of the culture medium and the incubation temperature are respectively adjusted to about 5.0 to 9.0, preferably about 6.0 to 8.0, and to about 28° to 37° C.

Under the above-mentioned culture conditions, the desired coenzyme Q is produced and accumulated in the microorganism cells in the culture broth.

Incubation is continued until the maximum amount of the objective coenzyme Q is accumulated in the microorganism cells. Although the period required for the maximum accumulation of the coenzyme Q is changeable depending on various factors, the amount of coenzyme Q in the microorganism cells reaches the maximum after 5 to 72 hours incubation.

The coenzyme Q thus accumulated in the cells is recovered by simple procedure. For example, the cells separated from the culture broth are either (1) extracted with a suitable non-polar organic solvent such as hexane, chloroform, isooctane or heptane, after saponification by heating with an alkali such as sodium hydroxide, potassium hydroxide, etc. or (2) extracted with a suitable hydrophilic organic solvent and the resulting extract extracted with above-mentioned non-polar organic solvent, if desired, after being subjected to saponification by heating with the said alkali or to treatment with an acid such as sulfuric acid or hydrochloric acid under heating. Thus-obtained coenzyme Q-containing extract can be subjected to column chromatography with the use of a suitable adsorbent such as alumina, silicic acid, magnesium silicate and aluminum silicate to obtain the objective coenzyme Q as crystals.

Following examples are merely intended to illustrate presently preferred embodiments of the present invention and not to restrict the scope of the latter. Throughout the present specification as well as in the following examples, the abbreviations "$\mu$g," "g" and "°C" respectively refer to microgram(s), gram(s) and degrees centigrade. In the following examples, parts by weight bear the same relation to parts by volume as do grams to milliliters. The coenzyme Q is determined by the method described in "Biochimica et Biophysica Acta" volume 32, page 73 (1959), after separation by the method appearing in "Biochemische Zeitschrift" volume 336, page 380 (1962).

EXAMPLE 1

Pseudomonas alkanolytica nov. sp. (ATCC 21034) is inoculated in 100,000 parts by volume of the culture medium set forth in Table 1, and the medium is incubated under shaking at 28° C for 20 hours.

TABLE 1

| | |
|---|---|
| Normal paraffin mixture* | 100 parts by volume |
| NH$_4$Cl | 6 parts by weight |

| | |
|---|---|
| KH$_2$PO$_4$ | 15 parts by weight |
| Na$_2$HPO$_4$ | 0.2 part by weight |
| MgSO$_4$·7H$_2$O | 2.5 parts by weight |
| CaCl$_2$·2H$_2$O | 0.5 part by weight |
| FeSO$_4$·7H$_2$O | 0.1 part by weight |
| Yeast extract | 2.0 parts by weight |
| Water | up to 1,000 parts by volume |
| | pH 7.0 |

* The mixture consists of normal paraffins of carbon atom numbers within the range from 11 to 23, the specific normal paraffins being contained in the following percentage relative to the whole weight of the mixture, and has a boiling range from about 262°C to about 349°C:

| Carbon Atom Number | Percent |
|---|---|
| 11 | 0.2 |
| 12 | 0.5 |
| 13 | 1.2 |
| 14 | 4.1 |
| 15 | 10.8 |
| 16 | 13.8 |
| 17 | 15.3 |
| 18 | 14.4 |
| 19 | 12.3 |
| 20 | 11.3 |
| 21 | 8.7 |
| 22 | 5.6 |
| 23 | 2.9 |

The resultant culture broth is inoculated in 1,000,000 parts by volume of the culture medium of the same composition as that in Table 1, and incubated with aeration and agitation at 30° C for 12 hours, the medium being kept at pH 7.0 with aqueous ammonia during the period of the incubation.

After the incubation, the resultant cells are collected by centrifugation to give 74,000 parts by weight (in terms of dried cells) of cells s containing 1300 μg/g (on dry basis) of coenzyme Q$_9$ and 818 μg/g (on dry basis) of coenzyme Q$_8$.

The cells are suspended in 500,000 parts by volume of ethanol. The suspension is kept standing at 25° C for 14 hours, followed by heating at 60° C with agitation for 1 hour, then the suspension is centrifuged to separate the ethanol layer from the cells. The extraction of the cells in 500,000 parts by weight of ethanol at 60° C with agitation for 1 hour is repeated three times, and the ethanol extracts are combined. The combined solution is subjected to extraction four times with hexane, each in a quantity of 300,000 parts by volume. Thus-obtained hexane solution is concentrated and dried under reduced pressure to give 8,830 parts by weight of residue.

The resultant residue is dissolved in 20,000 parts by volume of hexane, and the resulting solution is allowed to pass through a column packed with 88,000 parts by weight of activated magnesium silicate (commercially available as Florisil; see also U.S. Pat. No. 2,393,625). The column is washed first with 1,200,000 parts by volume of hexane, and subsequently with 1,100,000 parts by volume of hexane and chloroform (9:1 by volume). Then, the coenzyme Q adsorbed on the column is eluted with 4,400,000 parts by volume of a mixture of hexane and chloroform (4:1 by volume). The coenzyme Q-containing solution is evaporated to dryness under reduced pressure to give 133 parts by weight of residue. the residue is dissolved in 5,000 parts by volume of ethanol and the solution is kept standing at 0° C to yield 65 parts by weight of a mixture substantially consisting of coenzyme Q$_8$ and coenzyme Q$_9$.

Thus-obtained product is separable into each component, i.e., coenzyme Q$_9$ and coenzyme Q$_8$, for example, by the following procedure.

The mixture is dissolved in 1,000 parts by volume of hexane and the solution is chromatographed on two plates of silica gel treated with paraffin, using a mixture of acetone and water (9:1 by volume). Parts corresponding to coenzyme Q$_9$ and coenzyme Q$_8$ are eluted with 20,000 parts by volume of ethanol, respectively. Each extract is evaporated to dryness under reduced pressure and the resultant residue is dissolved in 500 parts by volume of hexane, then the solution is allowed to pass through a column packed with 5,000 parts by weight of Florisil. After being washed with 50,000 parts by volume of hexane, the column is eluted with 50,000 parts by volume of a mixture of hexane and chloroform (1:1 by volume), respectively. Each eluate is evaporated to dryness under reduced pressure, and the residue is dissolved in 2,000 parts of ethanol. Each solution is kept standing at 0° C overnight to give 42 parts by weight of coenzyme Q$_9$ as yellow platy crystals melting at 42.5° C and 20.5 parts by weight of coenzyme Q$_8$ as yellow platy crystals melting at 36° to 38° C.

In the process of this example, when the incubation process is carried out with a culture medium containing 100 parts by weight of glucose in place of the normal paraffin mixture, the microorganism cannot substantially grow.

EXAMPLE 2

*Achromobacter paraffinoclastus* nov. *sp.* (ATCC 21130) is inoculated and incubated in 1,000,000 parts by volume of the culture medium of the same composition as that in Table 1, with aeration and agitation at 30° C for 10 hours after the manner described in Example 1, whereby 62,000 parts by weight (in terms of dried cells) of cells containing 950 μg/g (on dry basis) of coenzyme Q$_9$ and 560 μg/g (on dry basis) of coenzyme Q$_8$ are obtained.

The cells are treated after the manner described in Example 1 to yield 30 parts by weight of coenzyme Q$_9$ as yellow platy crystals and 18 parts by weight of coenzyme Q$_8$ as yellow platy crystals.

In the process of this example, when the incubation process is carried out in a culture medium containing 100 parts by weight of glucose in place of the normal paraffin mixture, the microorganism cannot substantially grow.

EXAMPLE 3

*Pseudomonas aeruginosa* (ATCC 21036) is incubated in 1,000,000 parts by volume of the culture medium of the same composition as that in Table 1 with aeration and agitation at 30° C for 24 hours after the manner described in Example 1, whereby 55,000 parts by weight (in terms of dried cells) of cells containing 1,200 μg/g (on dry basis) of coenzyme Q$_9$ is obtained.

The cells are treated after the manner described in Example 1 to yield 34 parts by weight of coenzyme Q$_9$ as yellow platy crystals.

In the process of this example, when the incubation process is carried out in a culture medium containing 100 parts by weight of glucose in place of the normal paraffin mixture, less yield of coenzyme Q$_9$, i.e., 12 parts by weight of coenzyme Q$_9$ is obtained.

EXAMPLE 4

*Pseudomonas alkanolytica* nov.sp. (ATCC 21034) is incubated in 1,000,000 parts by volume of the culture medium set forth in Table 2, with aeration and agitation at 30° C for 14 hours, the medium being kept at pH 7.0 with aqueous ammonia, during the period of the incubation.

TABLE 2

| | |
|---|---|
| Normal paraffin mixture** | 100 parts by volume |
| NH$_4$Cl | 6 parts by weight |
| KH$_2$PO$_4$ | 15 parts by weight |
| Na$_2$HPO$_4$ | 0.2 part by weight |
| MgSO$_4$·7H$_2$O | 2.5 parts by weight |
| CaCl$_2$·2H$_2$O | 0.5 part by weight |
| FeSO$_4$·7H$_2$O | 0.1 part by weight |
| Yeast extract | 2.0 parts by weight |
| Water | up to 1,000 parts by volume |
| | pH 7.0 |

** The mixture consists of normal paraffins of carbon atom numbers within the range from 9 to 15, the specific normal paraffins being contained in the following percentage relative to the whole weight of the mixture, and has a boiling range from about 172 to 266°C:

| Carbon Atom Number | Percent |
|---|---|
| 9 | 11.4 |
| 10 | 19.2 |
| 11 | 23.8 |
| 12 | 23.9 |
| 13 | 18.9 |

| | |
|---|---|
| 14 | 2.4 |
| 15 | 0.5 |

After the incubation, the resultant cells are collected by centrifugation to give 70,000 parts by weight (in terms of dried cells) of ceels containing 1,250 μg/g (on dry basis) of coenzyme $Q_9$ and 520 μg/g (on dry basis) of coenzyme $Q_8$.

The cells are treated after the manner described in Example 1 to yield 42 parts by weight of conenzyme $Q_9$ as yellow platy crystals and 17.8 parts by weight of coenzyme $Q_8$ as yellow platy crystals.

EXAMPLE 5

*Candida tropicalis* (ATCC 20026) is incubated in 1,000,000 parts by volume of the culture medium of the same composition as that in Table I with aeration and agitation at 28° C for 20 hours after the manner described in Example 1, whereby 45,000 parts by weight (in terms of dried cells) of cells containing 750 μg/g (on dry basis) of coenzyme $Q_9$ is obtained.

The cells are treated after the manner described in Example 1 to yield 25 parts by weight of conenzyme $Q_9$ as yellow platy crystals.

In the process of this Example, when the incubation process is carried out in a culture medium containing 100 parts by weight of glucose in place of the normal paraffin mixture, less yield of coenzyme $Q_9$, i.e., 7.5 parts by weight of coenzyme $Q_9$ is obtained.

EXAMPLE 6

*Candida parapsilosis* (ATCC 10232) is incubated in 1,000,000 parts by volume of the culture medium of the same composition as that in Table 1 with aeration and agitation at 28° C for 20 hours after the manner described in Example 1, whereby 40,000 parts by weight (in terms of dried cells) of cells containing 840 μg/g (on dry basis) of coenzyme $Q_9$ is obtained.

The cells are treated after the manner described in Example 1 to yield 20 parts by weight of coenzyme $Q_9$ as yellow platy crystals.

In the process of this Example, when the incubation is carried out in a culture medium containing 100 parts by weight of glucose in place of the normal paraffin mixture, less yield of coenzyme $Q_9$, i.e., 7.5 parts by weight of coenzyme $Q_9$ is obtained.

EXAMPLE 7

*Candida claussenii* (ATCC 20027) is incubated in 1,000,000 parts by volume of the culture medium of the same composition as that in Table 1 with aeration and agitation at 28° C for 20 hours after the manner described in Example 1, whereby 48,000 parts by weight (in terms of dried cells) of cells containing 870 μg/g (on dry basis) of coenzyme $Q_9$ is obtained.

The cells are treated after the manner described in Example 1 to yield 28 parts by weight of coenzyme $Q_9$.

In the process of this Example, when the incubation is carried out in a culture medium containing 100 parts by weight of glucose in place of the normal paraffin mixture, less yield of coenzyme $Q_9$, i.e., 8.5 parts by weight of coenzyme $Q_9$ is obtained.

Having thus disclosed the invention, what is claimed is:

1. A process for producing coenzyme Q of the formula

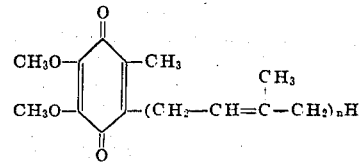

wherein n is an integer from 5 to 10 inclusive, which comprises incubating a coenzyme Q-producing microorganism selected from the group consisting of the Candida genus, and *Achromobacter paraffinoclastus* nov. sp. A.T.C.C. 21130 in a culture medium until the objective coenzyme Q is substantially accumulated in the microorganism cells and recovering therefrom the coenzyme Q so accumulated, the microorganism being a hydrocarbon-assimilating microorganism and the culture medium comprising a carbon source consisting mainly of hydrocarbons containing not less than 10 percent (volume/volume) of normal paraffins having a carbon atom number within the range from nine to 23 inclusive.

2. A process according to claim 1, wherein the culture medium contains about 3 to about 15 percent (volume/volume) of said normal paraffins based on the culture medium.

3. A process according to claim 1, wherein the normal paraffins have a carbon atom number within the range from 14 to 20 inclusive.

4. A process according to claim 1, wherein the hydrocarbon-assimilating microorganism belongs to the genus Candida.

5. A process according to claim 1, wherein the hydrocarbon-assimilating microorganism is *Candida tropicalis*.

6. A process according to claim 1, wherein the hydrocarbon-assimilating microorganism is *Candida parapsilosis*.

7. A process according to claim 1, wherein the hydrocarbon-assimilating microorganism is *Candida claussenii*.

8. A process according to claim 1, wherein the hydrocarbon-assimilating microorganism is *Achromobacter paraffinoclastus* nov. sp. A.T.C.C. 21130

* * * * *